US 6,516,666 B1

(12) United States Patent
Li

(10) Patent No.: US 6,516,666 B1
(45) Date of Patent: Feb. 11, 2003

(54) YAW RATE MOTION SENSOR

(75) Inventor: Guang X. Li, Gilbert, AZ (US)

(73) Assignee: Motorola, Inc., Schaumburg, IL (US)

( * ) Notice: Subject to any disclaimer, the term of this patent is extended or adjusted under 35 U.S.C. 154(b) by 194 days.

(21) Appl. No.: 09/665,332

(22) Filed: Sep. 19, 2000

(51) Int. Cl.[7] ............................................... G01C 19/00
(52) U.S. Cl. .............................. 73/504.12; 73/504.02; 73/504.08
(58) Field of Search .............................. 73/504.12, 488, 73/504.02, 504.03, 504.04, 504.08, 514.02, 504.16, 493; 257/254, 415, 417

(56) References Cited

U.S. PATENT DOCUMENTS

| 5,025,346 | A |   | 6/1991  | Tang et al. ............... 361/283   |
|-----------|---|---|---------|--------------------------------------|
| 5,814,727 | A |   | 9/1998  | Matsuda ................... 73/514.17 |
| 5,859,368 | A | * | 1/1999  | Cargille .................. 73/504.15 |
| 5,955,668 | A |   | 9/1999  | Hsu et al. ................ 73/504.12 |
| 5,995,668 | A | * | 11/1999 | Hsu et al. ................ 73/504.12 |
| 6,028,332 | A | * | 2/2000  | Kano et al. ................... 257/254 |
| 6,182,508 | B1 | * | 2/2001  | Takeuchi et al. ............... 73/493 |
| 6,209,394 | B1 | * | 4/2001  | Ferrari et al. ............ 73/504.14 |
| 6,227,050 | B1 | * | 5/2001  | Fujii et al. ............... 73/514.32 |
| 6,293,148 | B1 | * | 9/2001  | Wang et al. ................ 73/504.2 |
| 6,308,567 | B1 | * | 10/2001 | Higuchi et al. ........... 73/504.12 |

OTHER PUBLICATIONS

"A new silicon rate gyroscope," W. Geiger et al., Sensors and Actuators 73(1999) pp. 45–51.

* cited by examiner

*Primary Examiner*—Hezron Williams
*Assistant Examiner*—Jacques Saint-Surin

(57) ABSTRACT

A yaw rate motion sensor (10) that includes a driving element (12) having a first axis for oscillating generally in the direction of the first axis upon application of a driving voltage. The motion sensor (10) includes a sensing element (14) for sensing relative differences in capacitance occasioned from the driving element upon application of a Coriolis force induced by an angular rotation and linkage (16) between the driving element (12) and the sensing element (14).

13 Claims, 3 Drawing Sheets

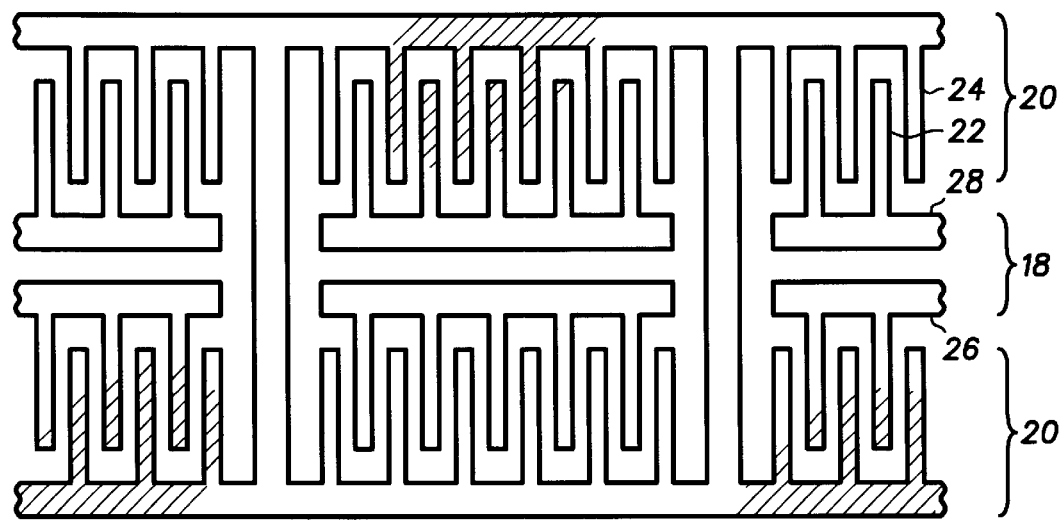
12  FIG. 2
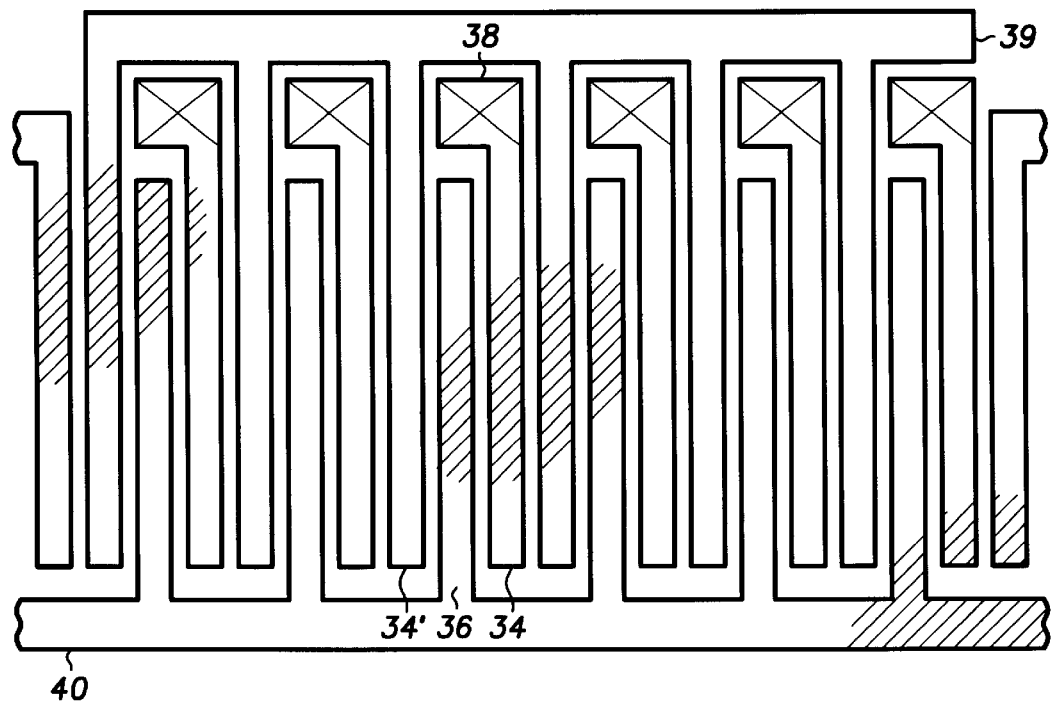
14  FIG. 3

YAW RATE MOTION SENSOR

The present invention relates generally to motion sensors, and more particularly, to a two moving proof mass improved yaw rate gyroscope sensor.

Inertial sensors are finding increased application in a variety of fields. A number of different types of inertial sensors exist. As transportation vehicle systems (e.g., roll detection, vehicle dynamics control, global positioning sensors, etc.) become more sophisticated, a need has developed for an expanded selection of sensors to help optimize operation of such vehicle systems.

Though some types of gyro type sensor devices have seen increased attention in recent years, a need still exists for different types of sensors, particularly those having enhanced sensitivity to applications of Coriolis Force, such as is frequently encountered in the detection of yaw. A need also still exists for a gyro type sensor that obviates the need for cross-axis coupling, and thereby improves the signal to noise characteristics of the sensor.

BRIEF DESCRIPTION OF THE DRAWINGS

FIG. 2 is an enlarged plan view of a portion of a driving element of the sensor illustrated in FIG. 1;

FIG. 3 is an enlarged plan view of a sensing element of the sensor illustrated in FIG. 1;

DETAILED DESCRIPTION OF THE DRAWINGS

Figure 1:
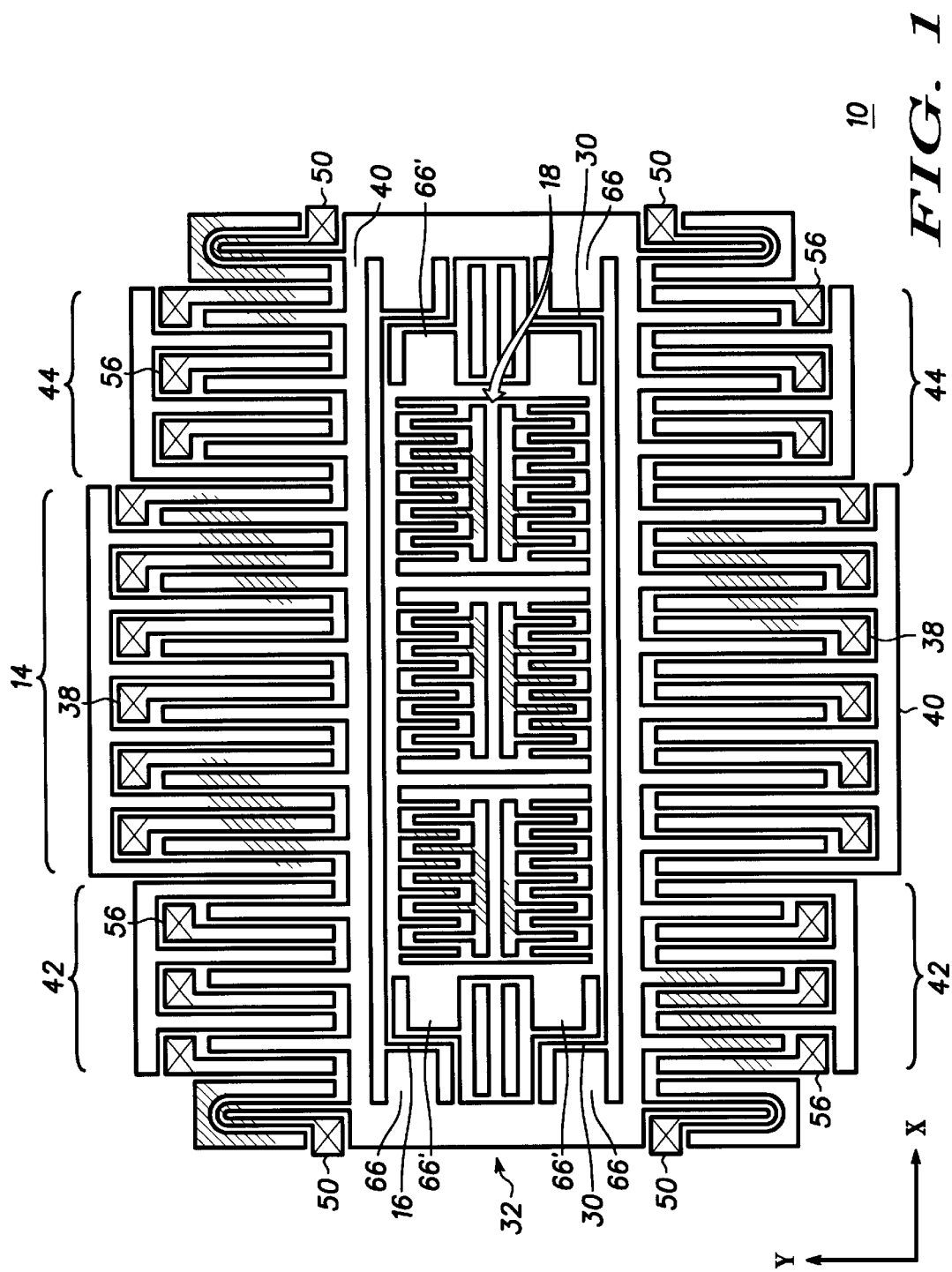
FIG. 1 is a plan view of a sensor in accordance with the present invention.

FIG. 1 illustrates a yaw rate motion sensor 10 that includes a driving element 12 having a first axis for oscillating generally in the direction of the y-axis upon application of a driving voltage. FIG. 2 is an enlarged plan view of a portion of a driving element of the sensor illustrated in FIG. 1. Referring to FIGS. 1 and 2, motion sensor 10 includes a driving element 12 configured along the x-axis, (see FIG. 1). A first mass 18 is preferably stationary for driving, although it may be moveable relative to a second mass, i.e., shuttle mass 20. Shuttle mass 20 is suspended in order to allow movement, oscillating generally in the direction of the y-axis upon application of a driving voltage. Driving element 12 has a first natural frequency in the direction of the first axis, i.e., the y-axis, and a second natural frequency in the direction of a second axis, shown in FIG. 1 as the x-axis. The second axis is generally perpendicular to the first axis and in the same plane as the first axis. Motion sensor 10 further includes a sensing element 14 for sensing relative differences in capacitance occasioned from the driving element upon application of a Coriolis force induced by an angular rotation. A linkage 16 translates motion from the driving element 12 to the sensing element 14.

Driving element 12 has a comb drive structure. The first mass 18 (see FIG. 2) includes a plurality of electrodes 22 as elongated members or fingers. A suspended shuttle mass 20 also has a plurality of elongated members or fingers, i.e., electrodes 24, that are interdigitatedly disposed relative to the plurality of electrodes 22. Shuttle mass 20 is suspended by one or a plurality of suspension flexure arms 30, affording linkage between the driving element 12 and sensing element 14 and the translation of forces therebetween. Flexure arms 30 may be generally straight, angled, or a combination thereof. FIG. 1 illustrates an angled configuration of flexure arms 30 that includes two generally straight portions oriented orthogonal to one another. Moreover, as shown in FIG. 1, the shuttle mass is generally attached to the sensing element at some point along its length (e.g., toward an end 32). Preferably, the linkage is such that driving element 12 can undergo an oscillatory vibration in the direction corresponding to the y-axis in FIG. 1 without causing a similar motion or other consequential feedback in sensing element 14.

FIG. 3 is an enlarged plan view of sensing element 14 of motion sensor 10 illustrated in FIG. 1. The sensing proof mass or sensing element 14 preferably is disposed in suitable sensing relationship adjacent driving element 12 and includes a suitable sensing electrode configuration. The sensing electrode configuration preferably includes at least one pair of first electrodes 34 and 34' and a second electrode 36 disposed therebetween generally in a plane defined by the first electrodes (shown in FIG. 1 as the x-y plane, with a z-plane perpendicular to the x-y plane). A plurality of stationary and moving electrodes are depicted in FIG. 1, the stationary electrodes 34 and 34' illustrated as fixed along its length (e.g., at its end) by a post structure 38 and a bar 39. The sensing element preferably includes a sensing mass 40 that is suspended for oscillation generally in the x-axis direction. The sensing mass exhibits a third natural frequency that is generally parallel to the x-axis (see FIG. 1). The third natural frequency preferably approximates the first natural frequency of driving element 12 and measures a relative difference in the capacitance occasioned from driving element 12 upon application of a Coriolis force induced by an external motion sought to be detected or measured.

Figure 4:
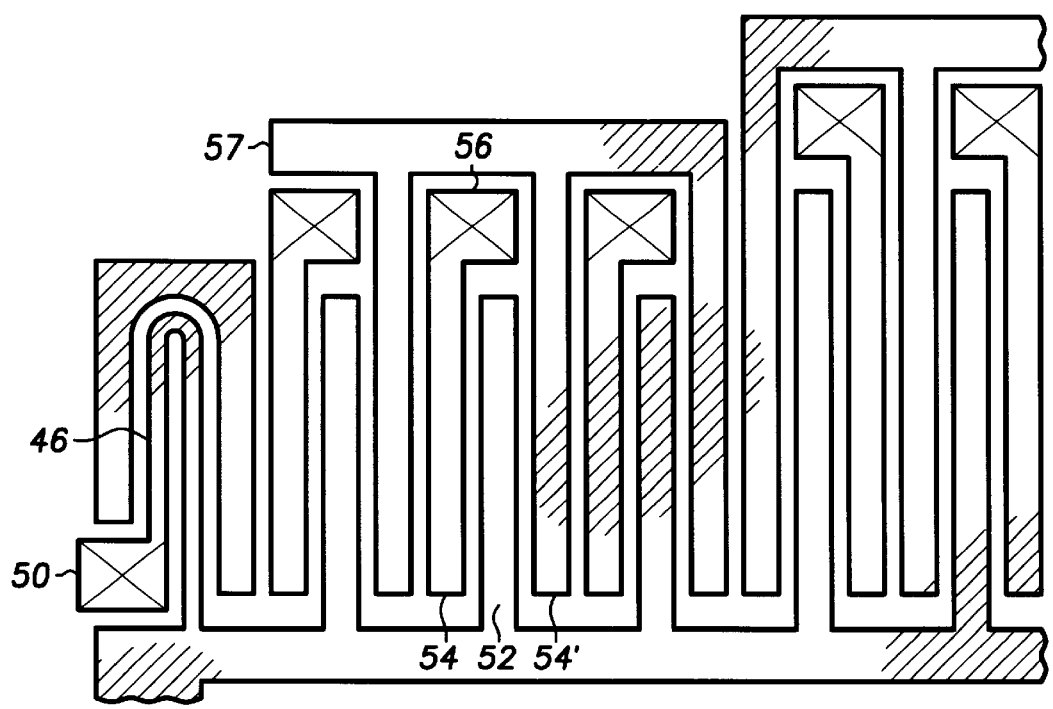
FIG. 4 is an enlarged plan view of a balancing electrode portion of the sensor illustrated in FIG. 1.
Figure 5:
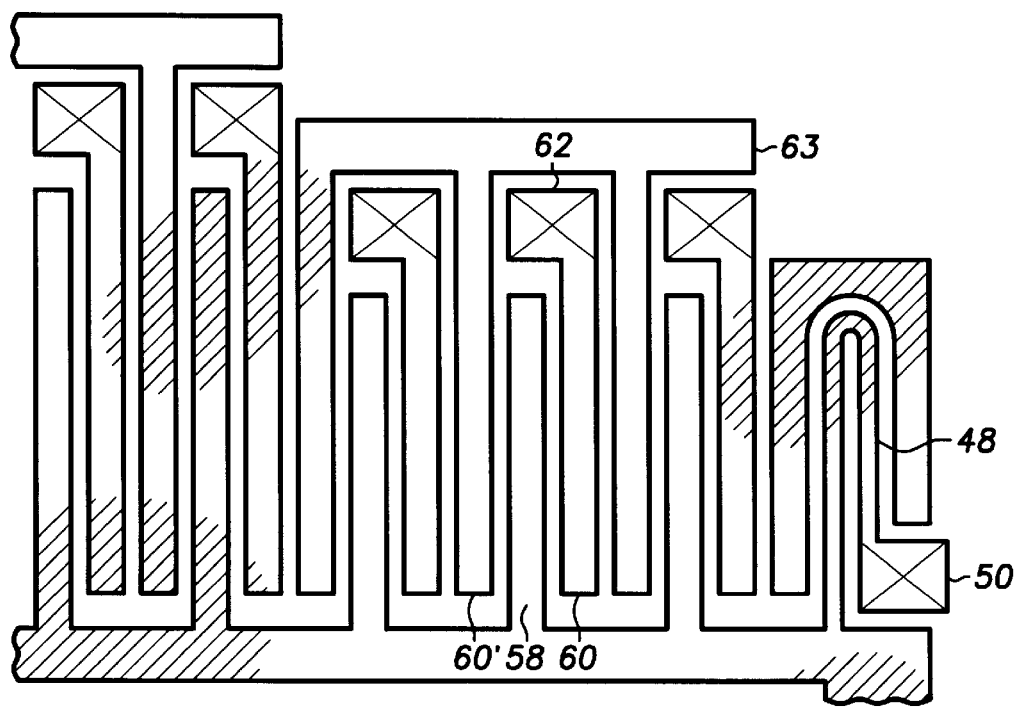
FIG. 5 is an enlarged plan view of a self-test portion of the sensor illustrated in FIG. 1.

Motion sensor 10 also includes connections for associating driving element 12 to sensing element 14. The connections shown in FIGS. 1, 4 and 5 are associated with either or both of a balancing portion 42 or a self-test portion 44 of motion sensor 10. Associated with the connections are biasing portions such as springs 46 and 48. The ends of the springs 46 and 48 are secured to sensing element 14 and to an underlying substrate by anchors 50.

Balancing portion 42 includes a plurality of sets of electrodes that are shown in FIG. 4 as having a first electrode 52 and a pair of second electrodes 54 and 54' movable relative to each other. First electrode 52 is flanked by second electrodes 54 and 54', with both of the second electrodes 54 and 54' being secured (e.g., to a substrate or other underlying surface) at some point along its length by a post 56 and a bar 57, respectively. The balancing portion may be connected to a power source for frequency tuning and for helping to maintain driving element 12 and sensing element 14 in a predetermined position relative to one another.

FIG. 5 is an enlarged plan view of a self-test portion 44 of the sensor illustrated in FIG. 1. Self-test portion 44 includes a plurality of sets of electrodes shown as having a first electrode 58 and a pair of second electrodes 60 and 60' movable relative to each other. First electrode 58 is flanked by each of the second electrodes 60 and 60', with both of the second electrodes 60 and 60' being secured (e.g., to a substrate or other underlying surface) at some point along its length by a post 62 and a bar 63. Self-test portion 44 may be connected to a power source as desired for testing and a memory for storing values which can be compared with data from the inducement of a predetermined amount of voltage through the self-test portion. A predetermined voltage is applied to post 62 or bar 63 in order to induce a-Coriolis force upon driving element 12 that is then sensed by sensing element 14. Sensed data is then compared with the stored data values to determine correspondence during calibration. Adjustments can be made as desired.

In operation, the fixed electrodes on the three sections of the lower portion of first mass 18 (see FIGS. 1 and 2) receive a first drive voltage, followed by a second drive voltage being supplied to the fixed electrodes on the three sections of the upper portion of first mass 18. The first and second drive voltages alternately supplied to the lower and upper portions of first mass 18 cause a movement or oscillation of suspended shuttle mass 20 in the y-axis. Thus, application of a driving voltage such as for example, a voltage alternately applied to a first side 26 (see FIG. 2) of first mass 18 and then a second side 28 of first mass 18 causes an oscillatory motion of shuttle mass 20 in the y-axis. With the application of the alternating driving voltage, suspended shuttle mass 20 and its associated fingers move with respect to first mass 18 and its the associated fingers and any rotational force about the z-axis of motion sensor 10 causes driving element 12 to move along the x-axis.

In response to the rotational force, sensing mass 40 induces translation of moving electrode 36 relative to stationary electrodes 34 and 34' for generating a change in capacitance. The movement of shuttle mass 20 in the x-axis generates a differential capacitance change in sensing element 14 that is proportional to the angular rate of rotation. The differential capacitance change is detected and converted to a voltage through an integrated device (not shown).

In a preferred embodiment, the first natural frequency is substantially different relative to the second natural frequency, or the characteristics of the respective components are otherwise tailored to avoid having consequential motion from sensing element 14 to feed back to driving element 12, or vice versa. Preferably, the first natural frequency differs relative to the second natural frequency by at least about 10%. More preferably, the first natural frequency differs relative to the second natural frequency by at least 15 to 20 percent (%).

The skilled artisan will appreciate that motion sensor 10 can be tuned as desired using any suitable technique. For instance, one or a plurality of variable dummy masses 66 and 66' (see FIG. 1) can be modified or substituted as desired to achieve the desired result. Likewise, the spring constant of any linkage or spring may be varied as desired, as may the number or size of electrodes or the magnitude of the electrical forces applied.

The sensors may be made using micromachining, microelectronic fabrication techniques, or other semiconductor fabrication techniques. Further, though certain components are depicted as an integrated structure (e.g., the sensing element 14), the elements may include separate structural units affixed to or integrated with a common or different suitable substrate (e.g., a semiconductor substrate) or other surface. Likewise, where shown as separate structural units, it is contemplated that the units may be integrated in a unitary structure. Moreover, stationary and moving functions may be interchanged among elements staying within the scope of the present invention. Further, similar results may be obtained using suitable combinations of moving components absent a stationary component, where the components move relative to each other.

The skilled artisan will appreciate the variety of different types of motion that the present sensor is capable of detecting, including but not limited to a variety of angular motions (such as pitch, roll, yaw or a combination of some or all), as well as certain linear motions. In the preferred embodiment, motion sensor 10 detects the yaw of a moving object and as such, may be employed in a transportation vehicle, such as an automobile. Motion sensor 10 may be used in the vehicle braking system, the cornering or steering system, the passive restraint system, the airbag deployment system, the power train system or any system where a motion sensor is required.

By now it should be appreciated that the motion sensor of the present invention is particularly suitable for sensing yaw in the presence of a Coriolis force. In embodiments where the driving element and the sensing element are separate components, the motion decoupling of the two masses helps to reduce a source of noise. The motion sensor also affords substantial flexibility for tuning and frequency selection for the driving element and the sensing element. Moreover, the overall construction lends the device well to the ability to electronically correct imbalance due to manufacturing tolerances without generation of substantial undesirable signals. Sensors of the present invention can be made according to a wide range of performance specifications. For instance, in automotive applications the sensor is capable of achieving a resolution of about 0.1 deg/sec, a drift of about 0.01 deg/sec and a bandwidth of 60Hz, or a combination of these characteristics.

What is claimed is:

1. A yaw rate motion sensor, comprising:
   a driving element having a first axis for oscillating generally in a direction of the first axis upon application of a driving voltage;
   a sensing element for sensing a relative difference in a capacitance occasioned from the driving element upon application of a Coriolis force induced by an angular rotation; and
   linkage for translating a motion from the driving element to the sensing element;
   wherein the linkage is adapted for driving a driving mass of the driving element at a first natural frequency of the driving mass;
   wherein the linkage is adapted for driving a sensing mass of the sensing element at a natural frequency that is at about the same frequency as the first natural frequency of the driving mass;
   wherein the first natural frequency of the driving mass and the natural frequency of the sensing mass are selected to minimize feedback from the sensing element to the driving element.

2. The yaw rate motion sensor of claim 1, wherein the driving element and the sensing element each include a plurality of fingers.

3. The yaw rate motion sensor of claim 2, wherein the plurality of the fingers of the driving element and the sensing element are interdigitated relative to one another.

4. A yaw rate motion sensor, comprising:
   a driving element having a first axis for oscillating generally in a direction of the first axis upon application of a driving voltage;
   a sensing element for sensing a relative difference in a capacitance occasioned from the driving element upon application of a Coriolis force induced by an angular rotation; and
   linkage for translating a motion from the driving element to the sensing element;
   wherein the driving element and the sensing element each include a plurality of fingers;

wherein the plurality of the fingers of the driving element and the sensing element are interdigitated relative to one another;

wherein the linkage is adapted for driving a driving mass of the driving element at a first natural frequency of the driving mass;

wherein the linkage is adapted for driving a sensing mass of the sensing element at a natural frequency that is at about the same frequency as the first natural frequency of the driving mass;

wherein the first natural frequency of the driving mass and the natural frequency of the sensing mass are selected to minimize feedback from the sensing element to the driving element.

5. A yaw rate motion sensor, comprising:

a driving element having a first natural frequency for oscillating generally in a direction of a first axis upon application of a driving voltage;

a sensing element having a natural frequency for sensing relative differences in capacitance occasioned from the driving element upon application of a Corioilis force induced by an angular rotation, the sensing element including a pair of first electrodes and a second electrode disposed generally in a plane defined by the first electrodes, whereupon the translation of the second electrode relative to the pair of the first electrodes generates a capacitance; and linkage for translating motion from the driving element to the sensing element.

6. The yaw rate motion sensor of claim 5, wherein the first natural frequency of the driving element is substantially different relative to the natural frequency of the driving element.

7. The yaw rate motion sensor of claim 5, wherein the first natural frequency differs relative to the natural frequency of the driving element by at least about 20%.

8. The yaw rate motion sensor of claim 5, further comprising:

a self-test portion for generating test data that is compared with data generated by the driving element and sensed by the sensing element; and a balancing portion for helping to maintain the driving element and the sensing element in a predetermined position relative to one another.

9. A yaw rate sensor, comprising:

a driving element having a driving mass for oscillating generally in a direction of a first axis upon application of a driving voltage, the driving element having a first natural frequency in the direction of the first axis and a second natural frequency in a direction of a second axis that is perpendicular to the first axis and in the same plane as the first axis;

a sensing element having a sensing mass with a third natural frequency approximating the first natural frequency for sensing relative differences in capacitance occasioned from the driving element upon application of a Coriolis force induced by an angular rotation, the sensing element including a pair of stationary electrodes and a moving electrode disposed generally in a plane defined by the stationary electrodes, whereupon the translation of the moving electrode relative to the stationary electrodes generates a capacitance; and linkage for translating motion from the driving element to the sensing element.

10. The yaw rate sensor of claim 9, wherein the linkage is adapted for driving the sensing mass at about the same frequency as the first natural frequency of the driving mass.

11. The yaw rate sensor of claim 9, wherein the first natural frequency of the driving element and the natural frequency of the sensing element are selected to minimize feedback from the sensing element to the driving element.

12. The yaw rate sensor of claim 9, wherein the first natural frequency of the driving element is substantially different relative to the second natural frequency of the driving element.

13. The yaw rate sensor of claim 9, wherein the linkage is adapted for driving the driving mass of the driving element at about the first natural frequency of the driving mass.

* * * * *